(12) United States Patent
Garis

(10) Patent No.: US 10,465,842 B1
(45) Date of Patent: Nov. 5, 2019

(54) TREE MOUNTED ASSEMBLIES AND METHODS OF USE

(71) Applicant: Matthew A Garis, Enid, OK (US)

(72) Inventor: Matthew A Garis, Enid, OK (US)

(*) Notice: Subject to any disclaimer, the term of this patent is extended or adjusted under 35 U.S.C. 154(b) by 0 days.

(21) Appl. No.: 15/864,605

(22) Filed: Jan. 8, 2018

Related U.S. Application Data

(60) Provisional application No. 62/444,249, filed on Jan. 9, 2017.

(51) Int. Cl.
*F16M 13/02* (2006.01)
*G03B 17/56* (2006.01)
*F16B 2/08* (2006.01)

(52) U.S. Cl.
CPC ......... *F16M 13/022* (2013.01); *G03B 17/561* (2013.01); *F16B 2/08* (2013.01); *F16M 2200/06* (2013.01); *G03B 17/563* (2013.01)

(58) Field of Classification Search
CPC ....... F16M 2200/06; F16B 2/08; F16B 13/02; F16B 13/022
USPC ................................................. 396/427, 428
See application file for complete search history.

(56) References Cited

U.S. PATENT DOCUMENTS

| | | | | |
|---|---|---|---|---|
| 5,622,342 A | * | 4/1997 | Mills | F16M 11/42 248/126 |
| 6,349,905 B1 | * | 2/2002 | Mills | F16M 11/14 248/126 |
| 7,540,457 B2 | * | 6/2009 | Oddsen, Jr. | F16M 11/105 248/278.1 |
| 8,683,909 B1 | * | 4/2014 | Copus | F41A 23/16 182/127 |
| 9,690,166 B1 | * | 6/2017 | Sanders | G03B 3/00 |
| 2008/0308688 A1 | * | 12/2008 | Dillard | A61B 90/50 248/123.11 |

FOREIGN PATENT DOCUMENTS

CA  2949508 A1 * 5/2017 .......... F16C 11/0695

* cited by examiner

*Primary Examiner* — Clayton E. LaBalle
*Assistant Examiner* — Linda B Smith
(74) *Attorney, Agent, or Firm* — John M. Behles

(57) ABSTRACT

Tree mounted assemblies and methods of use are provided herein. An example assembly or device includes a camera mount; a tree mounting bracket that is configured to couple with a trunk or branch of a tree, the tree mounting bracket forming a socket; an articulating armature that is coupled to the tree mounting bracket using a ball that is received within the socket of the tree mounting bracket, the articulating armature further having: a first armature portion coupled to the ball; and a second armature portion coupled to camera mount.

5 Claims, 3 Drawing Sheets

TREE MOUNTED ASSEMBLIES AND METHODS OF USE

CROSS REFERENCE TO RELATED APPLICATIONS

This application claims the benefit and priority of U.S. Provisional Application Ser. No. 62/444,249, filed on Jan. 9, 2017, which is hereby incorporated by reference herein in its entirety including all references and appendices cited therein, for all purposes.

FIELD OF THE INVENTION

The present disclosure pertains to tree mounted assemblies and methods of use. Embodiments of tree mounted assemblies include fully articulating camera mounts and tree stands.

SUMMARY

Various embodiments of the present disclosure are directed to a device, comprising: a camera mount; a tree mounting bracket that is configured to couple with a trunk or branch of a tree, the tree mounting bracket comprising a socket; an articulating armature that is coupled to the tree mounting bracket using a ball that is received within the socket of the tree mounting bracket, the articulating armature further comprising: a first armature portion coupled to the ball; and a second armature portion coupled to camera mount.

Various embodiments of the present disclosure are directed to a device, comprising: a tree mounting bracket that is configured to couple with a trunk or branch of a tree, the tree mounting bracket comprising a socket; an articulating armature that is coupled to the tree mounting bracket using a ball that is received within the socket of the tree mounting bracket, the articulating armature further comprising: a first armature portion coupled to the ball; and a second armature portion that is capable of coupling with a camera mount.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally described, the present disclosure is directed to various devices that are mounted to a tree. For example, some embodiments are directed to devices that allow for securing a camera to a tree. These devices can be mounted overhead of a user who can be located on the ground or in a tree stand below the camera mounting device. In some embodiments, the devices are fully articulating and can be selectively adjusted to compensate for different camera weights. These and other advantages of the present disclosure are provided below.

Figure 1:
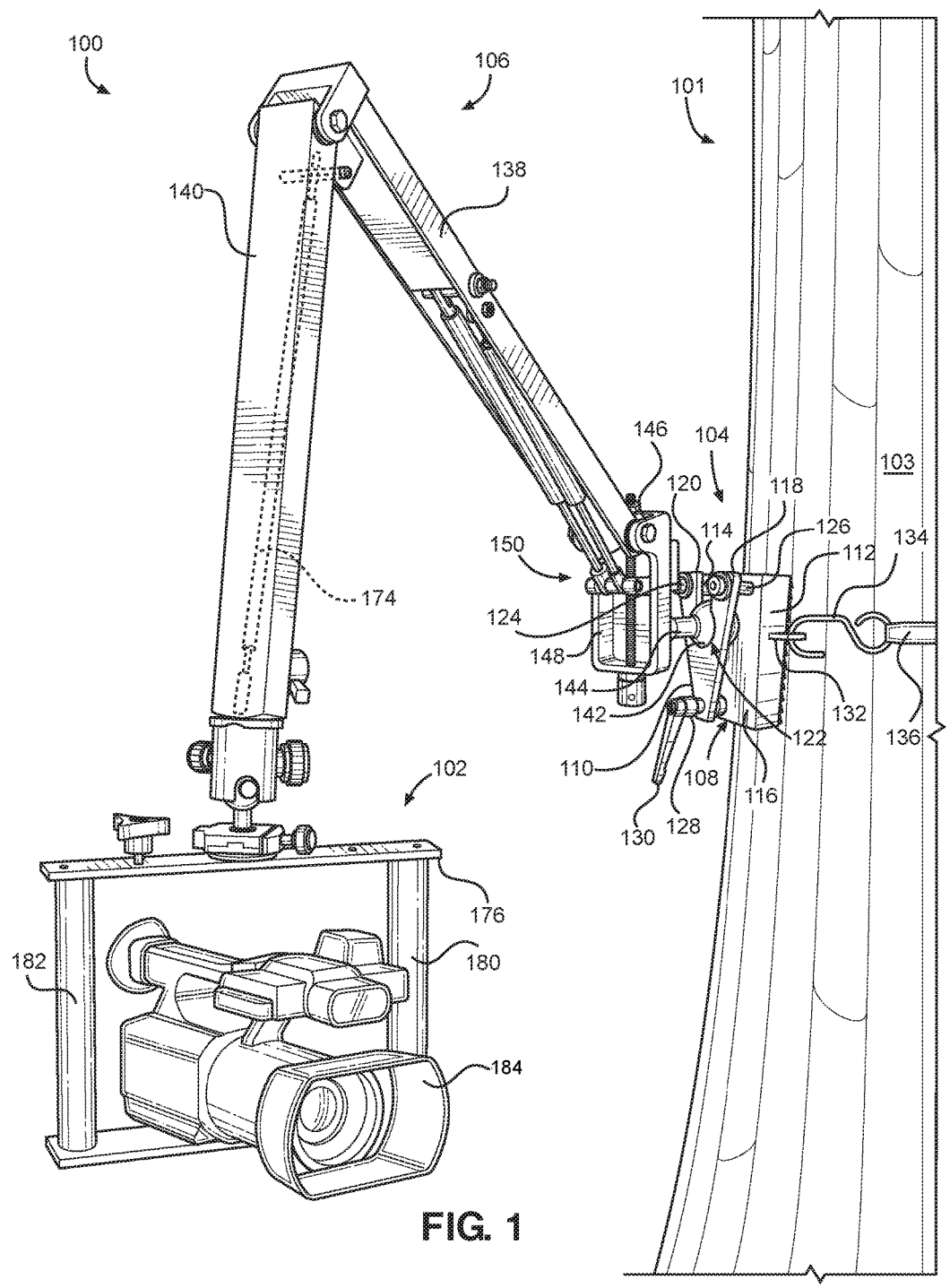
FIG. 1 is a perspective view of an example tree mounted camera device of the present disclosure.
Figure 2:
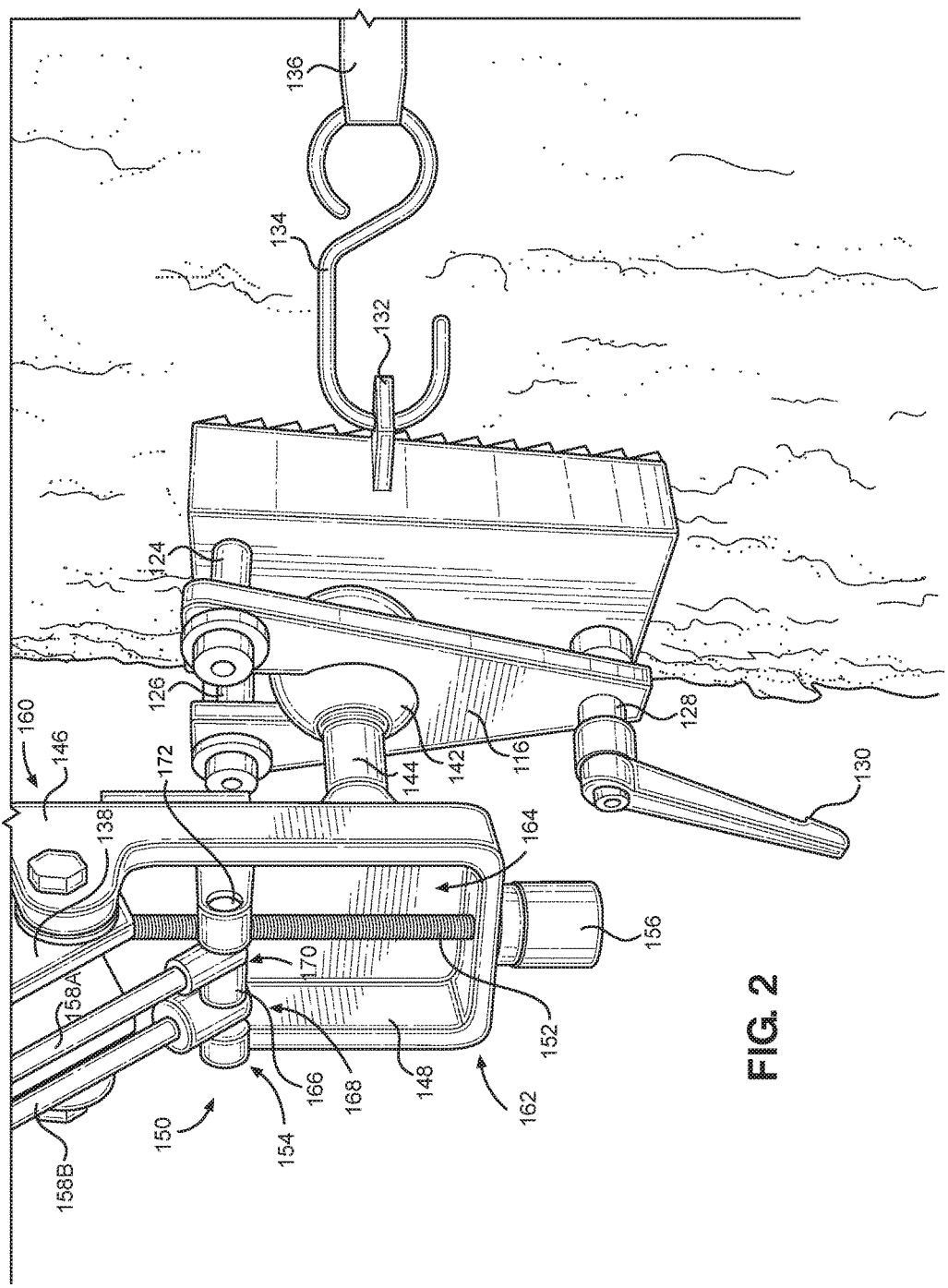
FIG. 2 is a close up perspective view of a tree mount and a selective weight compensator assembly of the device of FIG. 1.

FIGS. 1 and 2 collectively illustrate an example tree mounted device (hereinafter "device 100"). In general, the device 100 comprises a camera mount 102, a tree mounting bracket 104, and an articulating armature 106. The device 100 can comprise additional components selected from the embodiments disclosed herein. That is, unless noted otherwise, components of embodiments disclosed herein can be removed or recombined in other desired configurations.

The device 100 is illustrated as being mounted to a tree 101, and specifically a trunk 103 of the tree 101. It will be understood that the fully articulating nature of the device 100 and universal movement of the articulating armature 106 relative to the tree mounting bracket 104 allow the device 100 to be mounted to surfaces that are not completely vertical, such as a tree branch of the tree.

Turning to FIG. 2, which illustrates a close of up view the tree mounting bracket 104. In some embodiments, the mounting bracket 104 comprises a base 108 and a spacer plate 110. In some embodiments, the base 108 is configured to mount to a surface of the tree. The base 108 comprises opposing side plates 112 and 114 that contact the tree, as well as a middle plate 116.

In one or more embodiments, the spacer plate 110 comprises a v-shaped opening forming arms 118 and 120. The spacer plate 110 also comprises a circular notch 122 at a vertex of the v-shaped opening. This configuration forms a socket that receives a ball, which will be disclosed in greater detail infra.

The spacer plate 110 is spaced apart from the middle plate 116 of the base 108 using a first upper stud 124 and a second upper stud 126. These upper studs are associated with the arms 118 and 120 of the spacer plate 110.

Also holding the spacer plate 110 apart from the middle plate 116 of the base 108 is a lower stud 128. In some embodiments, the lower stud 128 is associated with a locking handle 130. The operation and use of the locking handle 130 will be described in greater detail below.

In various embodiments, each of the side plates 112 and 114 comprise an anchor plate, such as anchor plate 132. Each of the anchor plates comprise an aperture that receives a hook 134 of a strap 136 used to cinch the mounting bracket 104 to the tree. That is, the strap 136 is provided with two hooks and each of the hooks is coupled with one of the side plates 112 and 114.

In some embodiments, the articulating armature 106 comprises two portions such as first armature portion 138 and second armature portion 140. In some embodiments, the first armature portion 138 is coupled with the mounting bracket 104 using a ball 142. As noted above, the ball 142 is received within the socket (e.g. circular v-shaped notch/opening) of the mounting bracket 104. The ball 142 partially extends above an upper surface of the spacer plate 110.

In operation, the ball is positioned within the circular notch 122 of the spacer plate 110 and contacts the middle plate 116 of the base 108 of the mounting bracket 104. The first armature portion 138 can freely pivot or swivel relative to the mounting bracket 104 through the ball and socket arrangement. When the user desires to lock the first armature portion 138 in a current position, the user can turn the locking handle 130 of the mounting bracket 104 into a locked position (see FIG. 2). When the user desires to move the first armature portion 138, the user can move the locking handle 130 of the mounting bracket 104 into an unlocked position (which is opposite of that illustrated in FIG. 2). When the locking handle 130 of the mounting bracket 104 is moved into the locked position, the locking handle 130 compresses the spacer plate 110 onto the ball 142, which compresses the ball 142 against the middle plate 116 of the base 108 of the mounting bracket 104.

Also, the presence of the circular notch 122 allows the articulating armature 106 to be removed from the mounting bracket 104 by placing the locking handle 130 in an unlocked position and disengaging the ball 142 from the circular notch 122.

In general, the articulating armature 106 is coupled to the tree mounting bracket 104 using the ball that is received within the socket of the tree mounting bracket 104.

Turning to FIG. 2, in some embodiments, the ball 142 extends from a post 144 that extends from a ball mount 146. In one or more embodiments, the ball mount 146 is associated with one end of the first armature portion 138. The ball mount 146 comprises a partial enclosure 148 that houses a selective weight compensator assembly 150.

The selective weight compensator assembly 150 generally comprises a threaded rod 152, a translation bracket 154, and an adjustment member 156, and one or more pistons.

In various embodiments, the threaded rod 152 extends from a first end 160 to a second end 162 of a cavity 164 of the ball mount 146. In some embodiments, the translation bracket 154 is threaded onto the threaded rod 152. The translation bracket 154 will receive one or more ends of the one or more pistons 158. For example, in some embodiments, the device 100 includes two pistons 158A and 158B. The ends of pistons 158A and 158B are locked into the translation bracket 154.

In more detail, the translation bracket 154 comprises a body 166 that has a threaded pass-through that receives the threaded rod 152. The body 166 comprises notches 168 and 170 that receive the ends of the pistons 158A and 158B. In some embodiments, the ends of the pistons 158A and 158B are secured in placing using a fastener or pin such as fastener 172 inserted though the body 166.

In one embodiment, the adjustment member 156 is positioned below the partial enclosure. The adjustment member 156 allows for rotating the threaded rod 152 in order to translate the translation bracket 154. For example, when the adjustment member 156 is turned in one direction, the translation bracket 154 will move towards the first end 160. When the adjustment member 156 is turned in the opposite direction, the translation bracket 154 will move towards the second end 162. By changing a location of the translation bracket 154, and in turn the ends of the pistons 158A and 158B, the pistons and the first armature portion 138 can support different weights of cameras or other objects suspended from or associated with the second armature portion 140.

In some embodiments, opposing ends the pistons 158A and 158B are coupled to an underside of the first armature portion 138. In some embodiments, the pistons 158A and 158B can be replaced with a single piston.

The second armature portion 140 is hingedly coupled to the first armature portion 138. The second piston set includes a single piston 174 that connects to an inside surface of the second armature portion 140 and terminates at an opposite end by connecting to the first armature portion 138.

The camera mount 102 is disposed on an opposing end of the second armature portion 140. In some embodiments, the camera mount 102 can be connected to the second armature portion 140 using any suitable means. In various embodiments, the camera mount 102 comprises a polygonal frame 178. The polygonal frame 178 in some embodiments is a rectangle with four frame members. In one or more instances, the side frame members 180 and 182 of the polygonal frame are handles. A camera 184 can be secured a lower frame member of the polygonal frame 178.

In operation, the device 100 can be mounted above a tree stand (not shown). Because of the upside-down V-shape of the articulating armature 106, the camera mount 102 is positioned in front or to the side of the user. Thus, the user can utilize the device 100 to film hunting events while fully seated or standing in their tree stand.

Figure 3:
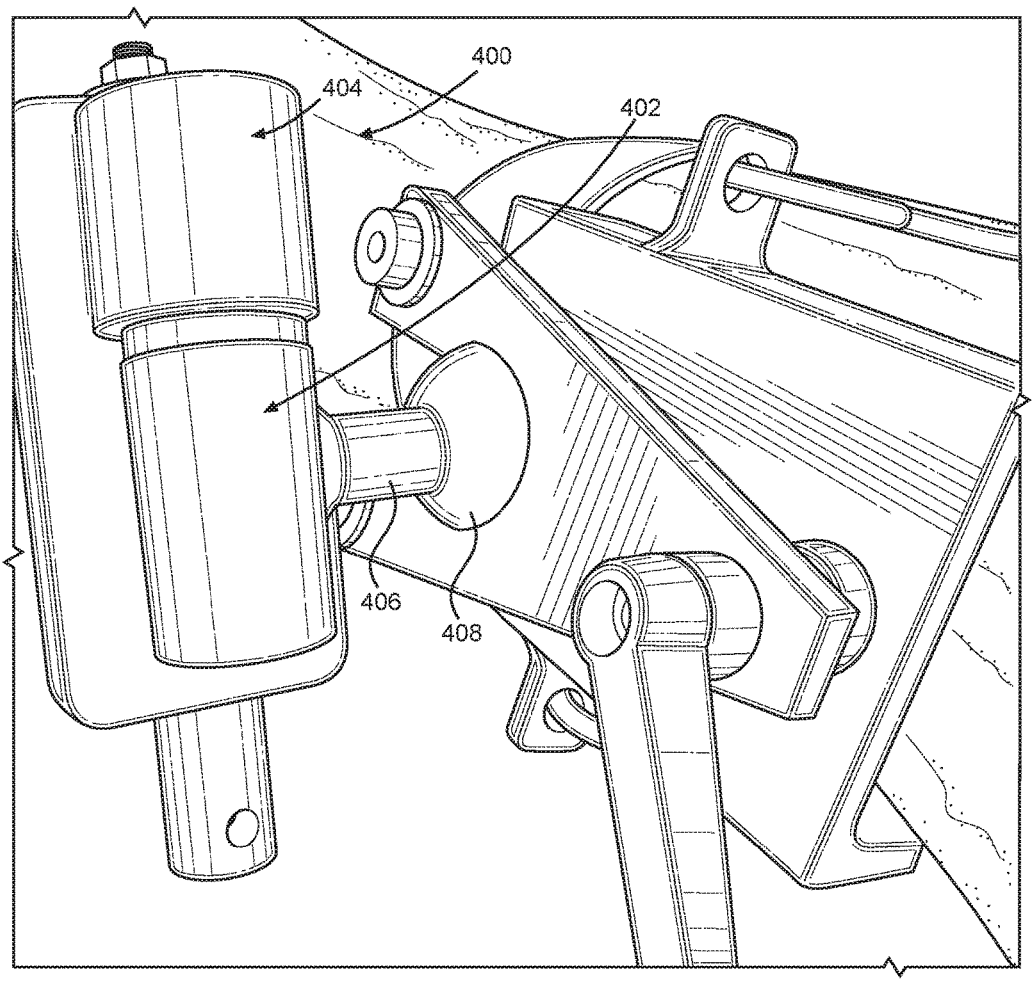
FIG. 3 is a rear perspective view of an example swiveling ball mount.

FIG. 3 illustrates another example ball mount 400 that can be utilized with the embodiments of a device 100 described above. In general, the device 100 of FIGS. 1 and 2 can incorporate the ball mount 400 of FIG. 3.

In one embodiment, the ball mount 400 is a swiveling member that comprises a receiver section 402 and a cap section 404. A shaft is inserted into the receiver section 402 and is covered by the cap section 404. In some embodiments, a post 406 couples the receiver section 402 and a ball 408. The ball 408 functions similarly to the ball of the embodiment of FIGS. 1 and 2. Thus, an armature assembly (not shown) can swivel relative to the post 406 when the ball 408 is locked into place using the tree mounting bracket. For example, the cap section 404 is coupled to a partial enclosure that houses a selective weight compensator assembly. The partial enclosure or housing swivels as the cap section 404 rotates on the shaft between the receiver section 402 and the cap section 404. This swiveling movement allows for additional range of motion of the articulating armature.

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A device, comprising:
 a camera mount, wherein the camera mount comprises a polygonal frame that receives a camera, wherein side members of the polygonal frame are handles;
 a tree mounting bracket that is configured to couple with a trunk or branch of a tree, the tree mounting bracket forming a socket;
 an articulating armature that is coupled to the tree mounting bracket using a ball that is received within the socket of the tree mounting bracket, the articulating armature further comprising:
 a first armature portion coupled to the ball;
 a first piston set coupling the first armature portion to the tree mounting bracket;
 a second armature portion coupled to a camera mount;
 a second piston set coupling the second armature portion to the first armature portion;
 a ball mount positioned between an end of the first armature portion and the ball that is received within the socket of the tree mounting bracket, wherein the ball mount comprises a selective weight compensator assembly that comprises a means for translating anchor points of the first piston set within the ball mount, wherein translating the anchor points compensates for different camera weights; and
 wherein the means for translating anchor points of the first piston set within the ball mount comprises:
 a threaded rod extending from a first end to a second end of a cavity of the ball mount;
 a translation bracket that is threaded onto the threaded rod, wherein ends of the first piston set are joined to the translation bracket; and
 an adjustment member for rotating the threaded rod to allow for translation of the translation bracket.

2. The device according to claim 1, wherein the tree mounting bracket comprises two anchor plates disposed on opposing sides of the tree mounting bracket.

3. The device according to claim 2, further comprising a tensioning strap having hooks that engage with the anchor plates of the tree mounting bracket, the tensioning strap being used to secure the device to the trunk or branch of the tree.

4. A device, comprising:
 a tree mounting bracket that is configured to couple with a trunk or branch of a tree, the tree mounting bracket comprising a socket;
 an articulating armature that is coupled to the tree mounting bracket using a ball that is received within the socket of the tree mounting bracket, the articulating armature further comprising:
 a first armature portion coupled to the ball;
 a second armature portion having a camera mount disposed on a terminal end of the second armature portion;
 a ball mount disposed on an end of the first armature portion;

a threaded rod extending from a first end to a second end of a cavity of the ball mount;

a translation bracket that is threaded onto the threaded rod, wherein an end of a first piston that couples the first armature portion with the ball mount is joined to the translation bracket; and an adjustment member for rotating the threaded rod to allow for translation of the translation bracket.

5. A device, comprising:

a camera mount;

a tree mounting bracket that is configured to couple with a trunk or branch of a tree, the tree mounting bracket forming a socket, wherein the socket is formed between a base of the tree mounting bracket and a spacer plate that is held in spaced apart relationship to the base, wherein the ball is at least partially positioned in a space between the base and the spacer plate, wherein the spacer plate comprise a v-shaped opening with a circular notch at a vertex of the v-shaped opening;

an articulating armature that is coupled to the tree mounting bracket using a ball that is received within the socket of the tree mounting bracket, the articulating armature further comprising:

studs positioned between the base and the spacer plate at one end and a locking handle disposed on an opposing end of the spacer plate, wherein the locking handle can prevent the ball from moving within the socket;

a first armature portion coupled to the ball; and a second armature portion coupled to camera mount.

\* \* \* \* \*